United States Patent Office 3,577,510
Patented May 4, 1971

3,577,510
PROCESS FOR THE PRODUCTION OF DEEP-DRAWABLE, STERILIZABLE POLYESTER FILM
Peter Josef Schmitz, Eberhard Werner, and Walter Seifried, Wiesbaden-Biebrich, Germany, assignors to Kalle Aktiengesellschaft, Wiesbaden-Biebrich, Germany
Filed Oct. 10, 1967, Ser. No. 674,244
Claims priority, application Germany, Oct. 13, 1966, K 60,455
Int. Cl. B29c 25/00
U.S. Cl. 264—342
2 Claims

ABSTRACT OF THE DISCLOSURE

This invention relates to a process for the production of deep-drawable, sterilizable polyester film having a good shelf life in which stress is applied to an amorphous polyester film in orthogonal directions in the plane of the film, whereby the film is thinned to at most ⅑ of the original film thickness, and the film is then at most doubled in thickness due to retardation at temperatures between 120° and 140° C.

---

Figure 1:
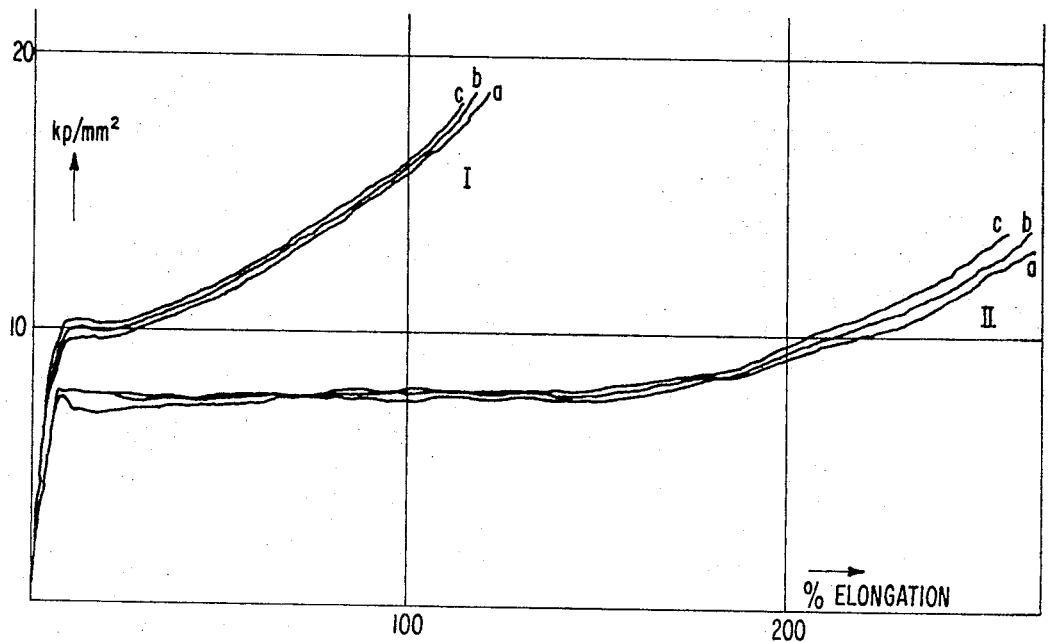

Due to their good physiological properties, their resistance to high temperatures, and their low permeability to gas and water vapor, films of polyesters are well suited for packaging foodstuffs, particularly those which are to be rendered storable by a sterilizing process. But whereas amorphous unstretched polyester films have excellent deep-drawing properties, containers made therefrom undergo a loss of mechanical properties, owing to crystallization of a coarse crystalline structure, and this becomes particularly noticeable in an undesired brittleness. If, however, films of polyester are improved by orientation in orthogonal directions, this is always combined with a loss of the deep-drawing capacity of the film, since the decrease of extensibility connected with orientation does not permit a subsequent deformation to the desired extent.

It now has been found that such disadvantages can be avoided and polyester films can be produced which are suitable for deep-drawing, are sterilizable, and have a good storage life, in that the thickness of the amorphous polyester lm is decreased, at most, to one-ninth of the original thickness by applying a stress in orthogonal directions in the plane of the film, and the polyester film is then, at most, doubled in its thickness due to retardation at temperatures between 120 and 140° C. The polyester films produced in this way have a planar orientation of 0.02 to 0.07 and an elongation at rupture of at least 200 percent at 120° C. in either direction of the plane of the film.

Films of amorphous polyester will not undergo an undesirable crystallization of a coarse crystalline structure during storage, which leads to brittleness, if they are slightly oriented.

Measurement of the orientation of the amorphous polyester film may be made by the double refraction of light by incidence of the light perpendicular to the film plane $(n_1-n_2)$, in the film plane in the direction of orientation $(n_2-n_3)$, and perpendicular thereto $(n_1-n_3)$. The preferable measure of orientation is the planar orientation double refraction $$\Delta n_{or} = \frac{(n_1-n_2)}{2} + (n_2-n_3)$$

in which $n_1$, $n_2$, and $n_3$ stand for the refraction indices, measured at the wave length of the yellow sodium line $(\lambda = 0.59 \cdot 10^{-3}$ mm.), in the direction of orientation, perpendicular thereto in the film plane, and perpendicular to the film plane. Due to the tensile elongation of polyesters above the glass transition temperature, a certain orientation is necessary in order not to considerably impair the uniformity of thickness of the original film. Orientation is achieved by rendering the film thinner, the thinning ratio being in the range of ¼ to ⅑.

It has been found that even a planar orientation of 0.02 is sufficient to prevent the above-mentioned crystallization of a coarse crystalline structure and that a planar orientation of 0.035 is necessary for the production of a film of uniform thickness. As has further been found, the elongation crystallization occurring upon higher orientation inhibits a subsequent retardation process resulting in the fact that a subsequent deformation process is rendered difficult. It has been established that retardation may substantially improve the extensibility of a film.

Suitable polyester films to be used in the process of the present invention are films of linear polyesters of terephthalic acid with glycols of the general formula $$HO(CH_2)_nOH$$

in which $n$ is an integer from 2 to 10.

Preferably employed are films of polyethylene terephthalate.

The polyester films produced according to the process of the invention have an elongation of 150 percent at room temperature and of 200 percent at 120° C. The films preferably are produced by orientation of a film of polyethylene terephathalate the crystallinity of which is not above 10 percent (corresponding to a density of 1.3430 g./cm.³) with stretching stresses of not more than 2 kg./mm.², calculated on the initial cross-section of the film, at a stretching rate of 140,000 percent per minute in two orthogonal directions and thinning ratios of ¼ to ⅑ and subsequent retardation, preferably in two orthogonal directions, at the most up to a thickening by the factor 2 of its original thickness at temperatures of 120° C. to 140° C.

The invention will be further illustrated by reference to the accompanying drawings in which the tensile elongation of various films, prepared in accordance with the process of the present invention, is shown.

The polyester films produced according to the invention are distinguished by multiaxial deformability, particularly at temperatures above 120° C. They further possess a very high dimensional stability at temperatures up to 120° C. Furthermore, they have a good shock resistance, when stored either warm or cold, and are permeable to gas and water vapor only to a small extent.

The polyester films may be laminated according to known processes with polyolefin films or also may be provided with barrier coatings, e.g. of polyvinyl chloride.

The invention will be further illustrated in the following examples:

EXAMPLE 1

Samples of an 80μ thick polyethylene terephthalate film having a density of 1.3370 g./cm.³ are heated and, by applying a maximum stress of (a) 1.30 kg./mm.², (b) 1.60 kg./mm.², and (c) 1.70 kg./mm.², are successively rendered thinner in the longitudinal and transverse directions to ⅓ of the original film thickness. The total thinning ratio thus is ⅑. The resulting planar orientation $\Delta n_{or}$ is between 0.07 and 0.1.

The films thus obtained are heat-set under tension at 130° C. Their tensile elongation properties (FIG. 1, I: a, b, c) do not differ in the longitudinal and transverse directions. The extensibility is too poor for subsequent deformation of the material.

EXAMPLE 2

When the films produced according to Example 1 are subjected to heat-setting at 130° C., in which, by shortening the films are rendered thicker in the longitudinal and transverse directions by the factor of 1.41—this corresponds to a total factor of 2.0—of the original thickness, films are obtained which have good extensibility in the longitudinal and transverse directions. The tensile elongation is shown in FIG. 1, II: a,b,c.

EXAMPLE 3

When the films produced according to Example 1 are subjected to heat-setting at 130° C. in which in the longitudinal direction the films are rendered thicker by shortening the films by the factor of 1.42 of the original dimensions, films are obtained which have excellent extensibility in the longitudinal direction and are suitable as deep-drawable material.

The tensile elongation is shown in FIG. 1, II: a,b,c in the longitudinal direction and I: a,b,c in the transverse direction.

EXAMPLE 4

Figure 2:
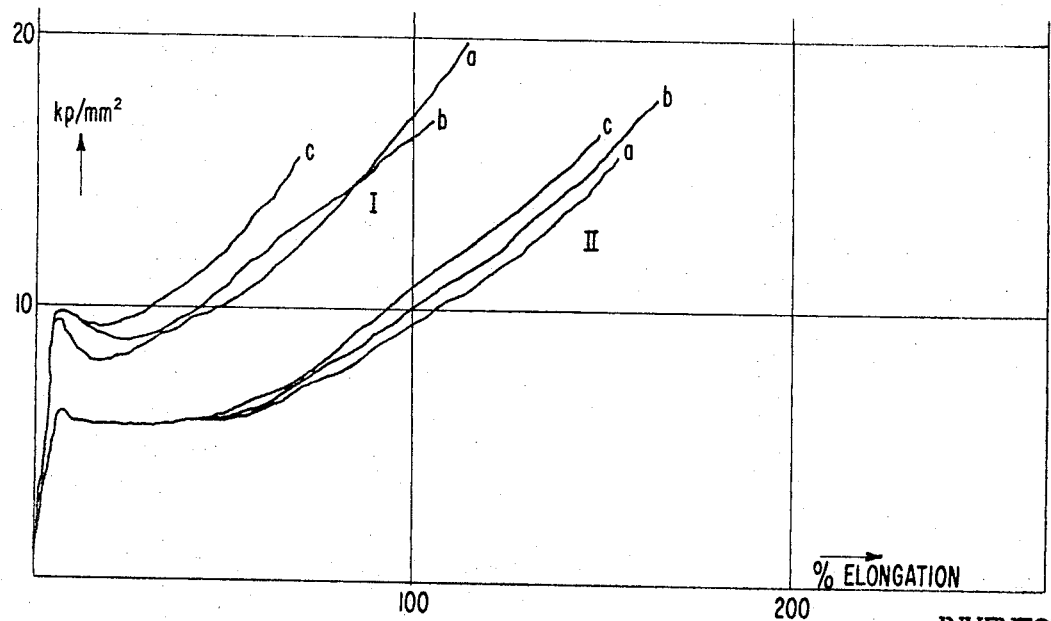

Samples of an 80μ thick polyethylene terephthalate film having a density of 1.3370 g./cm.$^3$ are heated and then rendered thinner in the longitudinal direction to 1/2.5 and in the transverse direction to 1/3 of the original film thickness under a maximum stress of (a)=1.30 kg./mm.$^2$, (b)=1.60 kg./mm.$^2$, and (c)=1.70 kg./mm.$^2$. The total thinning ratio thus is 1/7.5. The resulting planar orientation $\Delta n_{or}$ is between 0.06 and 0.08. The films thus obtained are heat-set at 130° C. while maintaining the dimensions. The tensile elongation of such films is shown in FIG. 2, I: a,b,c in the longitudinal direction and II: a,b,c in the transverse direction.

The material is not yet suitable for subsequent deformation.

EXAMPLE 5

When the films produced according to Example 4 are subjected to heat-setting at 130° C., in which, by shortening, the films are rendered thicker in the transverse direction by the factor of 1.25, a material is obtained which has excellent deep-drawing properties.

Figure 3:
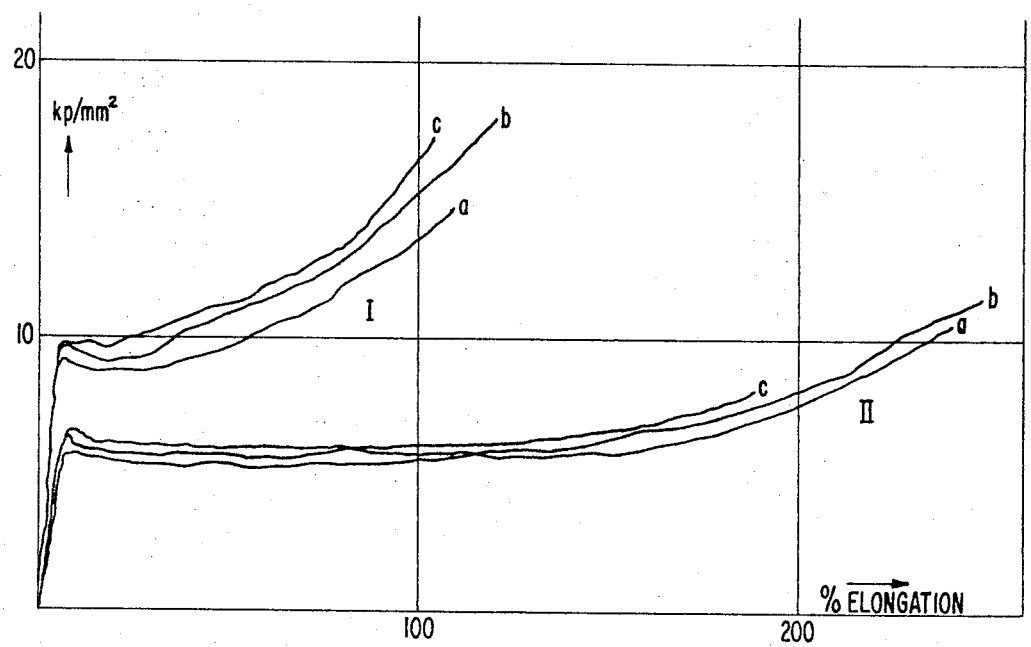

The tensile elongation of such films is shown in FIG. 3, I: a, b, c in the longitudinal direction and II: a, b, c in the transverse direction.

EXAMPLE 6

Samples of an 80μ thick polyethylene terephthalate film having a density of 1.3370 g./cm.$^3$ are heated and then, under a maximum stress of (a)=1.30 kg./mm.$^2$, (b)=1.60 kg./mm.$^2$, and (c)=1.70 kg./mm.$^2$, are thinned in the longitudinal direction to 1/2 and in the transverse direction to 1/3 of the original film thickness. The total thinning ratio thus is 1/6. The resulting planar orientation is between 0.05 and 0.06. The films thus obtained are heat-set at 130° C. under tension. The tensile elongation varies considerably. The extensibility of the material is not yet sufficient for subsequent deformation.

EXAMPLE 7

When the film produced according to Example 6 is heat-set at 130° C., thickening of the film by the factor of 1.42 being allowed by retardation, a material is obtained which has excellent deep-drawing properties.

EXAMPLE 8

Figure 4:
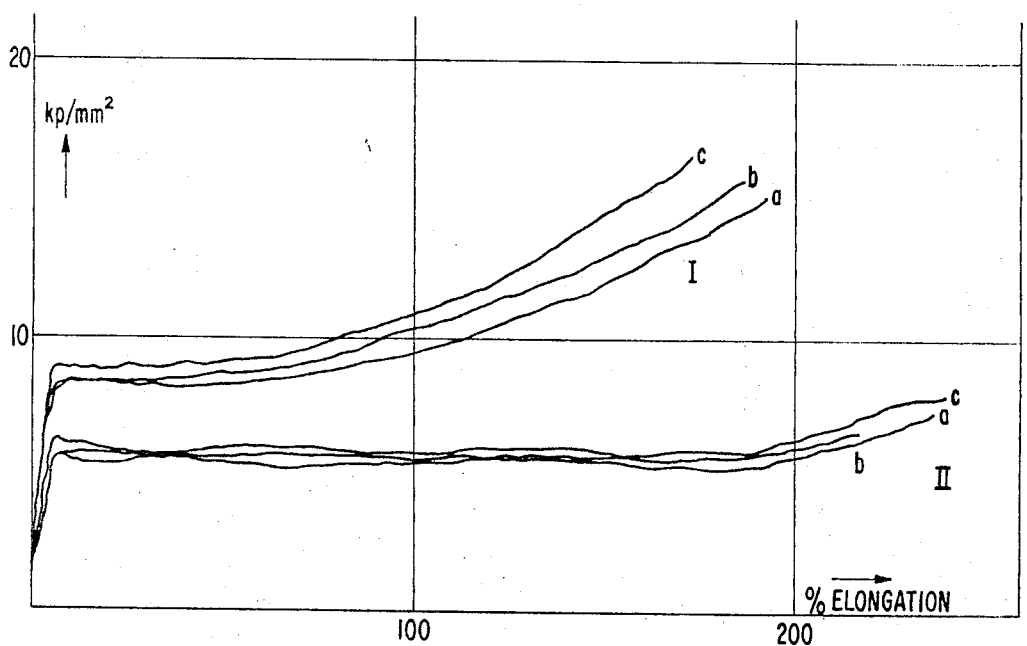

Samples of an 80μ thick polyethylene terephthalate film having a density of 1.3370 g./cm.$^3$ are heated and, by applying a maximum tension of (a)=1.15 kg./mm.$^2$, (b)=1.35 kg./mm.$^2$, and (c)=1.45 kg./mm.$^2$, are successively thinned in the longitudinal and transverse directions to 1/2.4 of the original film thickness. This corresponds to a total thinning ratio of 1/5.8. The medium planar orientation is between 0.053 and 0.075. The films thus obtained are heat-set at 130° C. while maintaining the dimensions. Their tensile elongation does not vary in the longitudinal and transverse directions and is shown in FIG. 4, I: a, b, c.

EXAMPLE 9

The films produced according to Example 8 are subjected to heat-setting at 130° C., a thickening of the films by the factor of 1.33 being permitted in the longitudinal direction by retardation. The samples resulting therefrom have excellent extensibility in the longitudinal direction and are suitable as deep-drawable film material. The tensile elongation of such films is shown in FIG. 4, II: a, b, c in the longitudinal direction and I: a, b, c in the transverse direction.

EXAMPLE 10

Films produced according to Example 8 are heat-set at 130° C., a thickening in the longitudinal and transverse directions by the factor of 1.53 being permitted by retardation. This corresponds to a thickening of the film by the factor of 1.77. The films have an excellent extensibility and their strengths do not differ in the longitudinal and transverse directions. Such a material is excellently suitable for a subsequent deep-drawing process.

The tensile elongation of such films in the longitudinal and transverse directions is shown in FIG. 4, II: a, b, c.

It will be obvious to those skilled in the art that many modifications may be made within the scope of the present invention without departing from the spirit thereof, and the invention includes all such modifications.

What is claimed is:
1. A process for the production of deep-drawable, sterilizable polyester film having a good shelf life which comprises applying stress to an amorphous polyester film in orthogonal directions in the plane of the film, whereby the film is thinned to at most one-ninth of the original film thickness, and then at most doubling the thickness of the film by retardation at a temperature between 120 and 140° C.

2. A process according to claim 1 in which the film is of polyethylene terephthalate.

References Cited

UNITED STATES PATENTS

| | | | |
|---|---|---|---|
| 3,496,143 | 2/1970 | Siggel et al. | |
| 2,603,838 | 7/1952 | Lowry et al. | 264—230 |
| 2,885,105 | 5/1959 | Heyl | 264—230 |
| 3,133,387 | 5/1964 | Harrison | 264—230 |
| 3,460,951 | 8/1969 | Heyl | 264—342 |
| 2,847,709 | 8/1958 | Sweet | 264—292X |
| 2,931,068 | 4/1960 | Kiston et al. | 264—342UX |
| 2,952,879 | 9/1960 | Kiston et al. | 264—342 |
| 3,007,201 | 11/1961 | Brummer | 264—292X |
| 3,349,153 | 10/1967 | Beck | 264—292X |
| 3,429,854 | 2/1969 | Siggel et al. | 264—292X |
| 3,432,591 | 3/1969 | Heffelfinger | 264—289 |

JAY H. WOO, Primary Examiner

U.S. Cl. X.R.

264—92, 234, 292